United States Patent [19]

Hwang

[11] Patent Number: 5,721,718
[45] Date of Patent: Feb. 24, 1998

[54] APPARATUS AND METHOD FOR DISCRIMINATING THE TYPE OF OPTICAL DISK MOUNTED INTO AN OPTICAL DISK REPRODUCING APPARATUS

[75] Inventor: Yong-Ha Hwang, Seoul, Rep. of Korea

[73] Assignee: Samsung Electronics Co., Ltd., Kyungki-do, Rep. of Korea

[21] Appl. No.: 703,727

[22] Filed: Aug. 27, 1996

[30] Foreign Application Priority Data

Sep. 30, 1995 [KR] Rep. of Korea ............... 33219/1995

[51] Int. Cl.$^6$ .................................................. G11B 7/00
[52] U.S. Cl. .................... 369/58; 369/44.25; 369/44.28; 369/32
[58] Field of Search ........................... 369/58, 54, 47, 369/48, 49, 50, 59, 32, 44.28, 44.27, 46.34, 44.25

[56] References Cited

U.S. PATENT DOCUMENTS 5,592,448  1/1997  Suzuki et al. ................ 369/58 X

*Primary Examiner*—Muhammad N. Edun
*Attorney, Agent, or Firm*—Sughrue, Mion, Zinn, Macpeak & Seas, PLLC

[57] ABSTRACT

An apparatus and method for discriminating an optical disk includes a spindle motor for rotating the optical disk, an optical pickup device for picking up data recorded the disk, a servo signal processor for processing signals for tracking and focus servo of the optical pickup device by a prescribed control signal, and driving the spindle motor by an output signal of a digital signal processor. The digital signal processor shapes a track zero cross signal picked up from the optical pickup device to a logic waveform. A controller controls the operation of the digital signal processor, stores an optical disk discriminating reference value, generates a gate pulse when the disk is mounted, and compares a counted value of the track zero cross signal with the optical disk discriminating reference value to discriminate the type of disk being used. A counter is provided for counting the track zero cross waveform-shaped signal from the digital signal processor during a uniform velocity interval.

8 Claims, 7 Drawing Sheets

APPARATUS AND METHOD FOR DISCRIMINATING THE TYPE OF OPTICAL DISK MOUNTED INTO AN OPTICAL DISK REPRODUCING APPARATUS

BACKGROUND OF THE INVENTION

1. Field of the Invention

The present application for an apparatus and method for discriminating an optical disk, is based on Korean Application No. 33219/1995 which is incorporated herein by reference for all purposes.

The present invention relates to a disk discriminating apparatus and method of an optical disk driving device, and more particularly to an apparatus and method for discriminating a type of a mounted optical disk using a characteristic that optical disks differ in track pitch.

2. Description of the Related Art

Generally, an optical disk reproducing apparatus is a compact disk player, a laser disk player, etc. for example, for reproducing data recorded on a disk by an optical system. The disk includes a compact disk and a laser disk, etc. The size of the disk can be selected to fit the intended purpose. The compact disk may be 8 cm and 12 cm in diameter, and the laser disk may be 20 cm and 30 cm in diameter.

The compact disk, which is one of the above-mentioned optical disks, has a track pitch of 1.6 µm. Recently, with an increase in the necessity for storing data of large capacity, a high density optical disk having a track pitch of 0.8 µm or less has been developed.

The optical disk reproducing apparatus should implement a suitable reproducing control operation according to the discriminated disk type.

FIG. 1 is a block diagram of a general optical disk reproducing apparatus. A spindle motor 4 is driven by the control of a servo signal processor 8 to rotate a disk 2. An optical pickup device 6 picks up data recorded on the disk 2 by an optical system to be supplied to an RF (radio frequency) amplifier 10. The servo signal processor 8 processes signals for a tracking servo, a focus servo, a sled servo, etc. of the optical pickup device 6 by the control of a controller 16 and the output signal of the RF amplifier 10, and drives the spindle motor 4 by the output signal of a digital signal processor 12. The RF amplifier 10 amplifies an RF signal picked up from the optical pickup device 6. The digital signal processor 12 shapes the RF signal amplified from the RF amplifier 10 to a logic waveform. Moreover, the digital signal processor 12 generates a constant linear velocity (CLV) locked signal when the disk 2 is accelerated from a stopped state to reach a first CLV, and generates a damping signal when the disk 2 is decelerated from the rotating state of the first CLV to reach a second CLV. The first CLV represents a CLV which can normally reproduce the data recorded on the disk 2, and the second CLV indicates a CLV which is capable of stopping the disk 2 at a decelerated rotating state. The digital signal processor 12 generates the CLV locked signal as a good frame synchronous (GFS) signal of logic "low" and generates the damping signal as a signal $\overline{PW64}$ of logic "low". A digital-to-analog (D/A) converter 14 converts a demodulated signal processed from the digital signal processor 12 to an analog signal. The controller 16 controls the reproducing operation of the servo signal processor 8 and the digital signal processor 12 in order to reproduce the data recorded on the disk 2.

The configuration of FIG. 1 is shown in "ILLUSTRATED COMPACT DISK" published on Sep. 1, 1988, Korea KANAM Co., pp. 240. For the detailed configuration and operation for the compact disk player, refer to the above "ILLUSTRATED COMPACT DISK".

FIG. 2 is a flow chart showing a disk discriminating control procedure. At step 31, the controller 16 checks whether the disk is mounted. If so, the controller 16 implements, at step 32, a focusing operation by controlling the servo signal processor 8. The controller 16 drives the spindle motor 4 by controlling the servo signal processor 8 to rotate the disk 2 at step 33. The controller 16 implements, at step 34, a tracking operation by controlling the servo signal processor 8 in order to take the tracking servo. The controller 16 conveys, at step 35, the optical pickup device 6 to the innermost portion of the disk 2 in order to read a region of a TOC (table of contents) of the disk 2 by controlling the servo signal processor 8. At step 36, the controller 16 checks whether a sled stop signal is detected. If the sled stop signal is detected, the controller 16 stops conveying the optical pickup device 6 by controlling the servo signal processor 8 and discriminates the type of disk being used by reading the region of the TOC of the disk 2.

In the prior art, the type of optical disk is discriminated by reading the region of the TOC. However, since the high density optical disk differs from the normal optical disk in rotary velocity, loop characteristic of various servos, and in format for the region of the TOC, it is hard to accurately discriminate the type of disk.

SUMMARY OF THE INVENTION

It is an object of the present invention to provide an apparatus and method for discriminating the type of disk being used by counting a track zero cross signal while a pickup device homes in on the inner portion of the disk in order to read a TOC.

An apparatus for discriminating an optical disk embodying the present invention includes: a spindle motor for rotating the optical disk by prescribed servo control; an optical pickup device for picking up data recorded on the disk by an optical system; a servo signal processor for processing signals for a tracking servo, a focus servo, a sled servo, etc. of the optical pickup device by a prescribed control signal, and driving the spindle motor by an output signal of a digital signal processor; the digital signal processor for shaping a track zero cross signal picked up from the optical pickup device to a logic waveform; a controller for controlling a whole operation of the digital signal processor, storing an optical disk discriminating reference value, generating a gate pulse when the disk is mounted, and comparing a counted value of the track zero cross signal with the optical disk discriminating reference value to discriminate a type of the disk; and a counter for counting the track zero cross signal waveform-shaped from the digital signal processor during a uniform velocity interval.

A method for discriminating the type of optical disk according to the present invention includes the steps of: counting a track zero crossing signal during a uniform velocity interval in which an optical pickup device is moved toward the innermost portion of the disk after the disk is mounted; and discriminating the type of disk by comparing the counted track zero crossing signal with a setting disk discriminating reference value.

BRIEF DESCRIPTION OF THE DRAWINGS

The above objects and advantages of the present invention will become more apparent by describing in detail preferred embodiments thereof with reference to the drawing in which.

DETAILED DESCRIPTION OF THE PREFERRED EMBODIMENT

Figure 1:
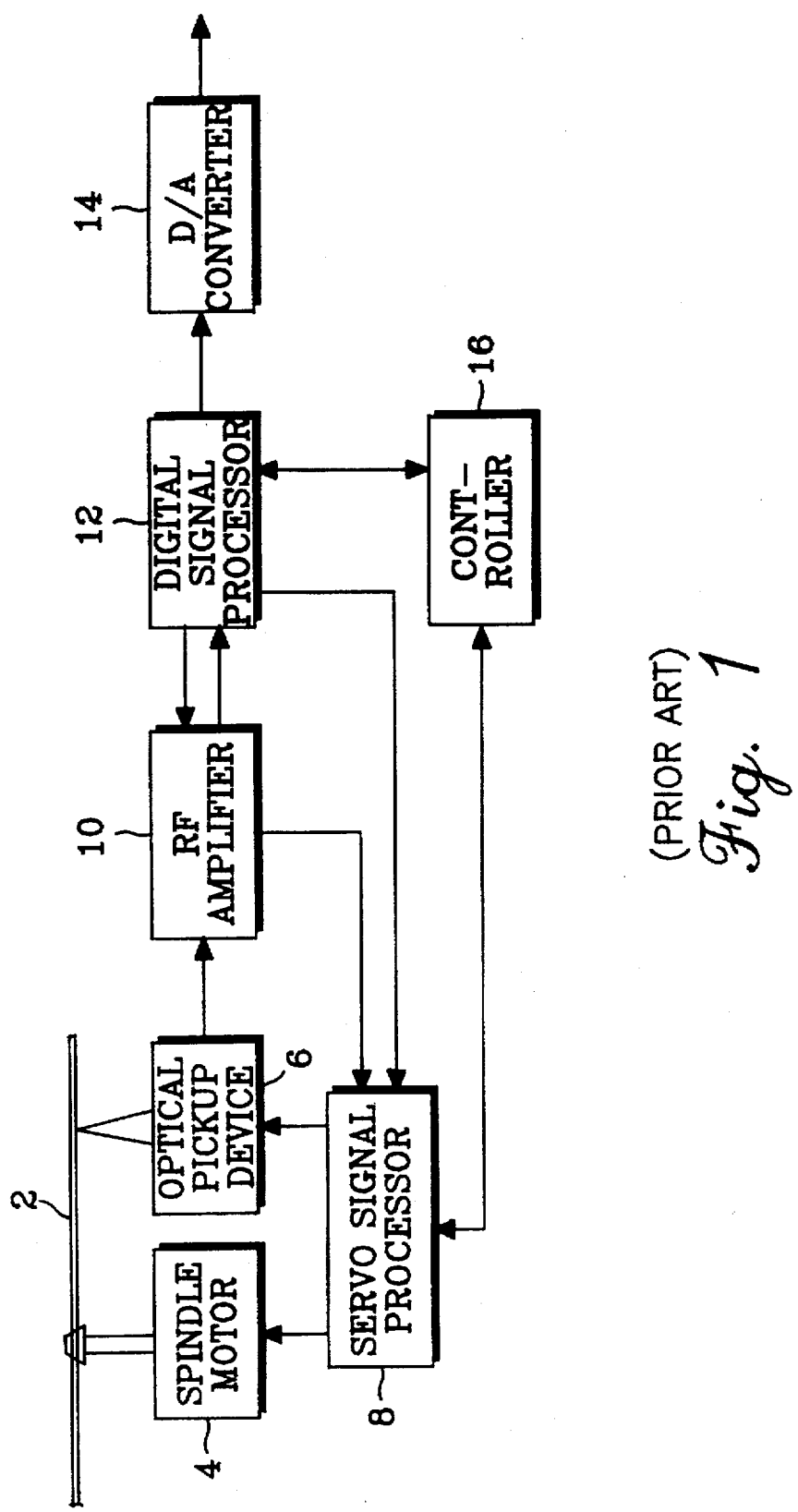
FIG. 1 is a block diagram of a general optical disk reproducing apparatus.
Figure 2:
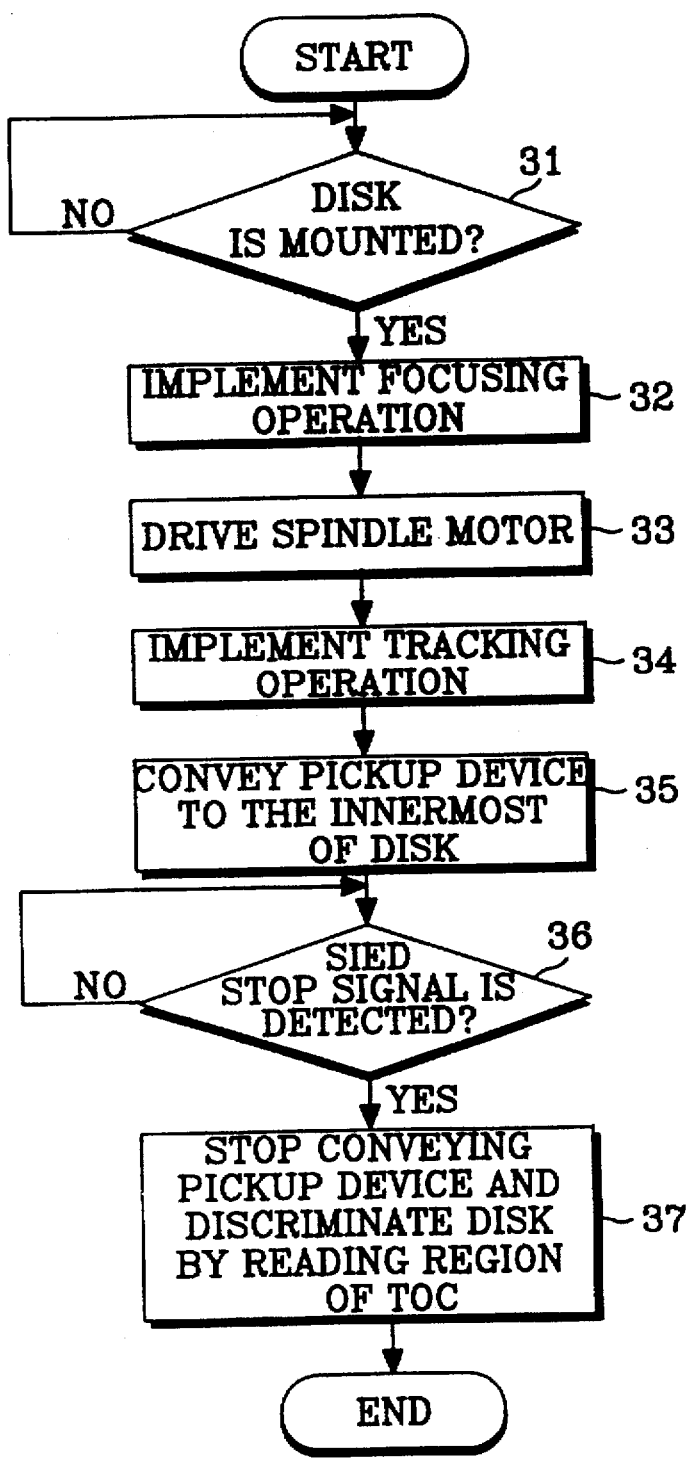
FIG. 2 is a flow chart showing a conventional disk discriminating control procedure.
Figure 3:
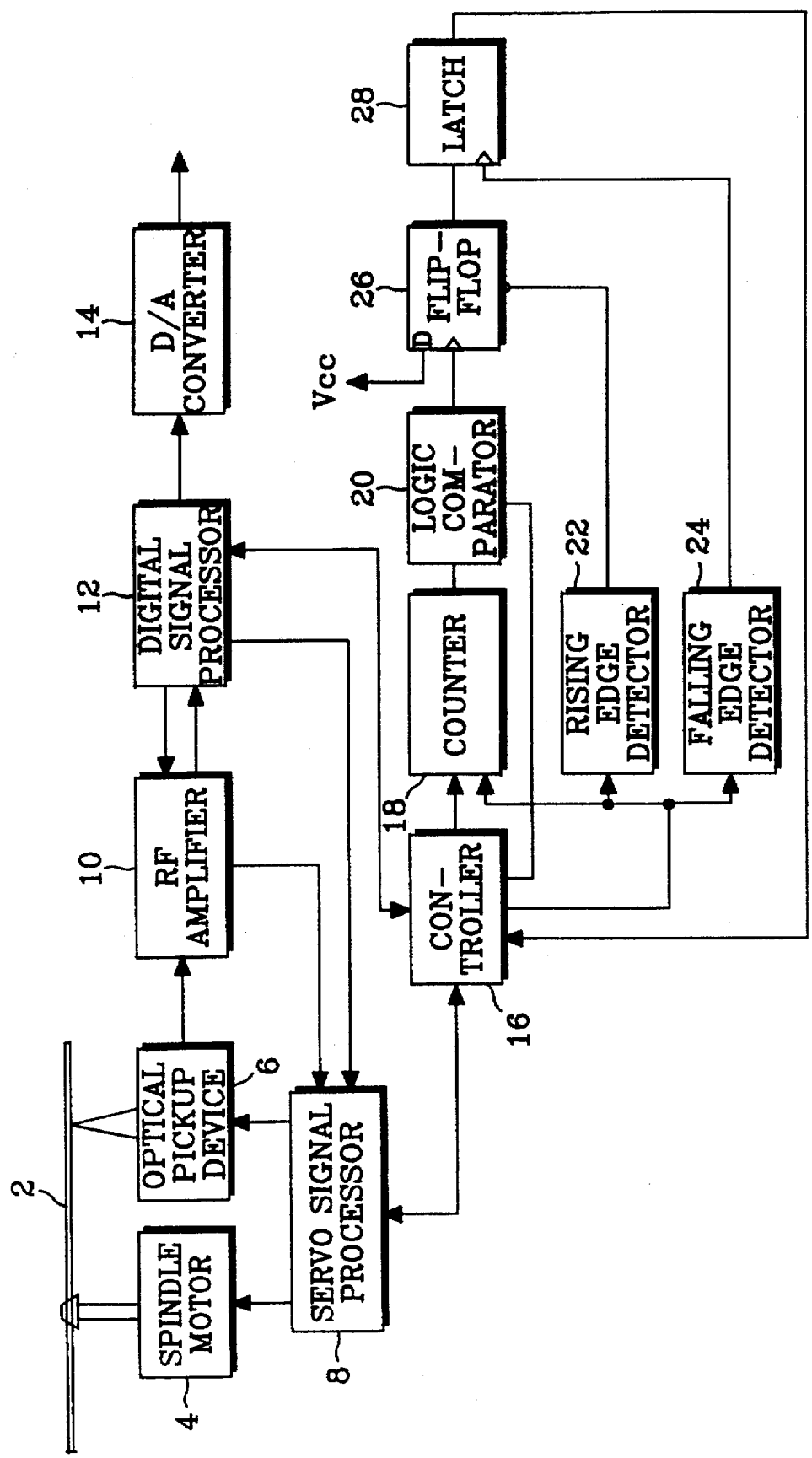
FIG. 3 is a block diagram of an optical disk reproducing apparatus according to one embodiment of the present invention.

Referring to FIG. 3, a spindle motor 4 is driven by the control of a servo signal processor 8 to rotate a disk 2. An optical pickup device 6 picks up data recorded on the disk 2, by an optical system, to be supplied to an RF amplifier 10. The servo signal processor 8 processes signals for a tracking servo, a focus servo, a sled servo, etc. of the optical pickup device 6 by the control of a controller 16 and the output signal of the RF amplifier 10, and drives the spindle motor 4 by the output signal of a digital signal processor 12. The RF amplifier 10 amplifies an RF signal picked up from the optical pickup device 6. The digital signal processor 12 shapes a track zero cross TZC signal, which is one of the RF signals amplified from the RF amplifier 10, to a logic waveform.

The controller 16 controls the reproducing operation of the servo signal processor 8 and the digital signal processor 12 in order to reproduce the data recorded on the disk 2, and stores a setting reference value for discriminating the type of disk. When the disk 2 is mounted, the controller 16 generates a gate pulse and discriminates the type of disk by a disk discriminating control signal. A counter 18 is enabled by the gate pulse generated from the controller 16 and counts the track zero cross TZC waveform-shaped signal supplied from the digital signal processor 12 during a uniform velocity interval. A logic comparator 20 compares a counted value generated from the counter 18 with the setting reference value stored in the controller 16 and generates the disk discriminating control signal. A rising edge detector 22 detects a rising edge of the gate pulse generated from the controller 16 to generate a rising edge detecting signal. A falling edge detector 24 detects a falling edge of the gate pulse generated from the controller 16 to generate a falling edge detecting signal. A flip-flop 26 is loaded by the rising edge detecting signal and maintains the disk discriminating control signal output from the logic comparator 20 to a constant logic state. A latch 28 latches the disk discriminating control signal, output from the flip-flop 26 by the falling edge detecting signal generated from the falling edge detector 24, which is to be supplied to the controller 16.

Figure 4:
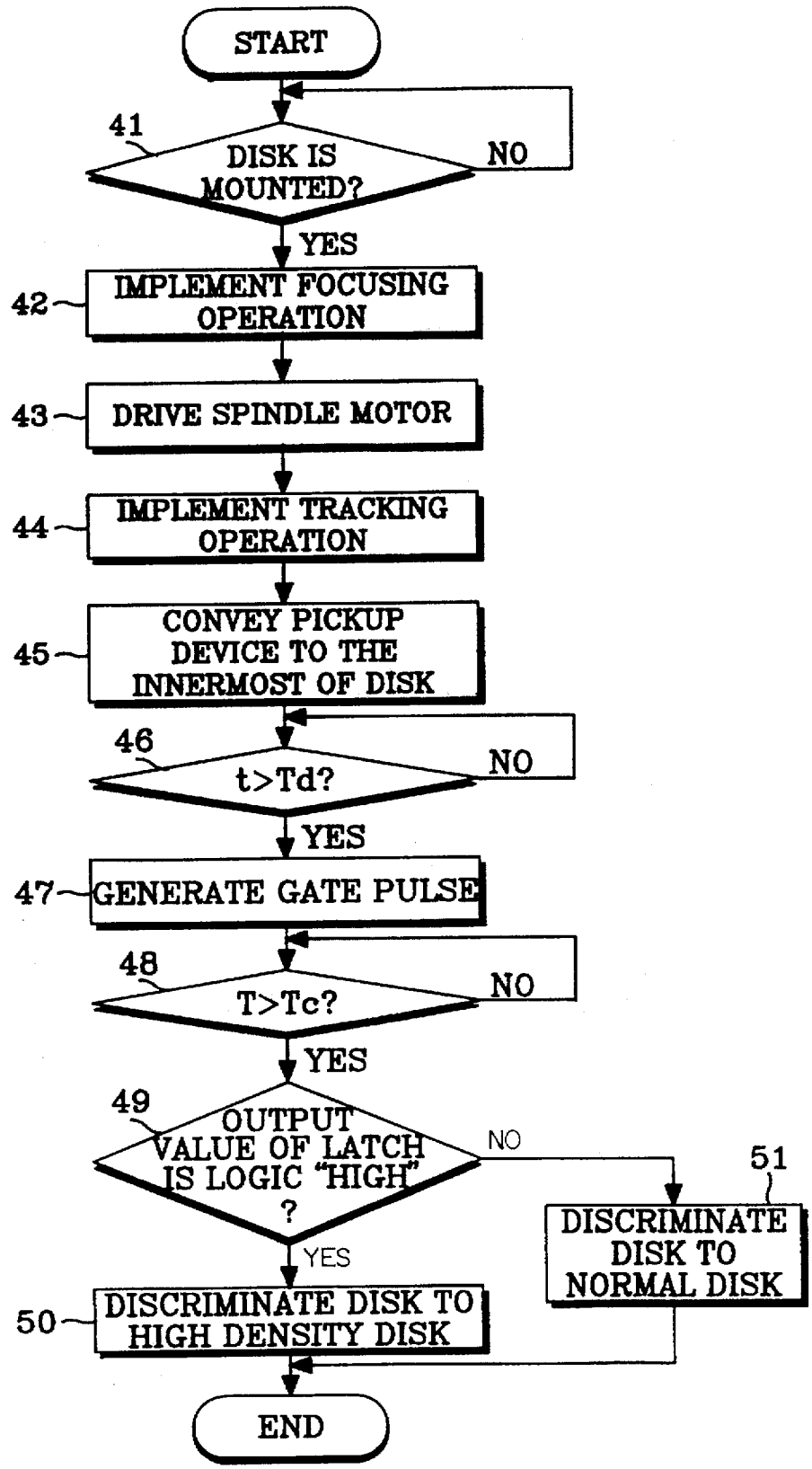
FIG. 4 is a flow chart showing a disk discriminating control procedure according to one embodiment of the present invention.

FIG. 4 is a flow chart showing a disk discriminating control procedure, and FIGS. 5A to 5I are operational waveform charts of each portion of the optical disk reproducing apparatus.

One preferred embodiment of the present invention will now be described in detail with reference to FIGS. 3, 4 and 5A to 5I.

Referring to FIG. 4, the controller 16 checks, at step 41, whether the disk 2 is mounted. If so, the controller 16 implements, at step 42, a focusing operation by controlling the servo signal processor 8. The controller 16 drives, at step 43, the spindle motor 4 by controlling the servo signal processor 8 to rotate the disk 2. The controller 16 implements, at step 44, a tracking operation by controlling the servo signal processor 8 in order to perform tracking servo. The controller 16 conveys, at step 45, the optical pickup device 6 to the innermost portion of the disk 2 in order to read a region of a TOC of the disk 2 by controlling the servo signal processor 8. The optical pickup device 6 generates a signal of a pulse train according to an optical quantity received from a photodiode while an optical beam spot crosses tracks and mirror portions of the disk 2. Since the two portions differ in the optical quantity received from the photodiode, the signal of the pulse train is supplied to the RF amplifier 10. The RF amplifier 10 amplifies the track zero cross TZC signal of this pulse form to be applied to the digital signal processor 12. The digital signal processor 12 waveform-shapes the track zero cross TZC signal to generate a signal shown in FIG. 5F or 5G.

The controller 16 checks, at step 46, whether a setting time Td from conveying the optical pickup device 6 has elapsed. That is, whether or not a sled motor reaches a uniform velocity interval is checked. If the setting time Td has elapsed, the controller 16 generates, at step 47, the gate pulse shown in FIG. 5B during the uniform velocity interval of a time Tc and supplies the gate pulse to the counter 18. The counter 18 counts the track zero cross TZC waveform-shaped signal from the digital signal processor 12. The track zero cross TZC signal indicates one period between track pitches. If the counted value of the track zero cross TZC signal of a normal disk is n and if the counted value of the track zero cross TZC signal of a high density disk is m during the uniform velocity interval, the controller 16 stores a logic value for an average value m+n/2 of two counted values. The controller 16 supplies the average value to the logic comparator 20 as the reference value. The logic comparator 20 compares the counted value of the track zero cross TZC signal with the reference value. If the counted value of the track zero cross signal TZC exceeds the reference value, the logic comparator 20 generates the disk discriminating control signal of logic "high", and if not, the logic comparator 20 generates the disk discriminating control signal of logic "low".

Figure 5:
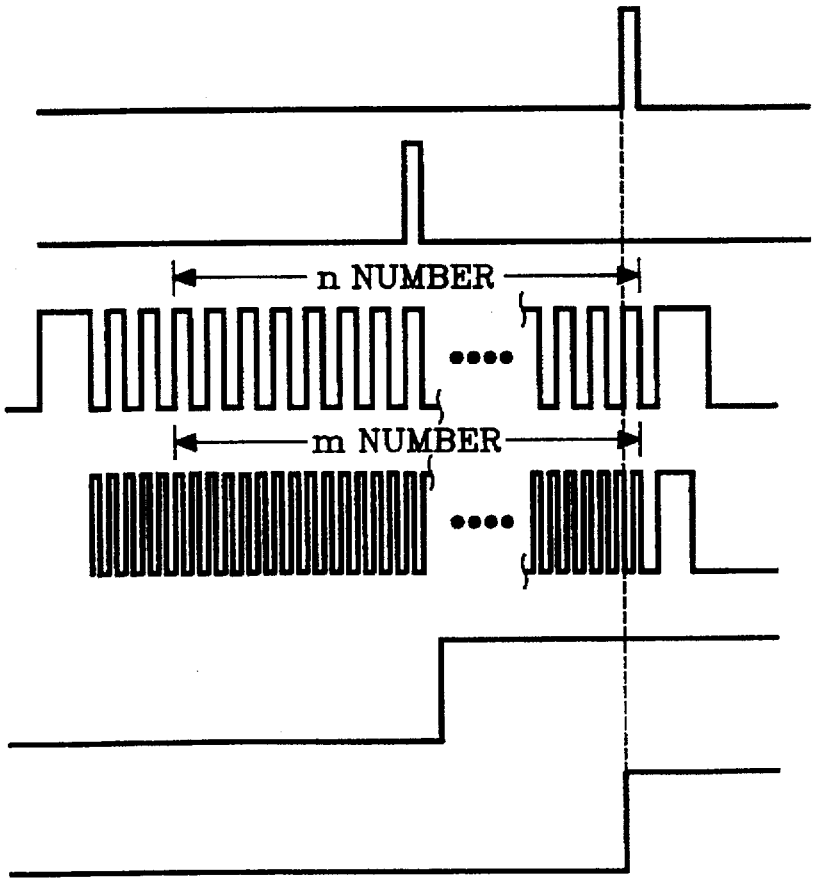
FIGS. 5A to 5I are operational waveform charts of each portion of the optical disk reproducing apparatus according to the present invention.

The rising edge detector 22 receives the gate pulse shown in FIG. 5B to detect the rising edge and supplies the rising edge detecting signal shown in FIG. 5C to a reset terminal of the flip-flop 26. The falling edge detector 24 receives the gate pulse shown in FIG. 5B to detect the falling edge and supplies the falling edge detecting signal shown in FIG. 5D to a clock terminal of the latch 28. The flip-flop 26 receives, through its clock terminal, a logic value of the disk discriminating control signal generated from the logic comparator 20, and maintains the received logic state value. When the falling edge detecting signal is generated from the falling edge detector 24, the latch 28 latches the disk discriminating control signal output from the flip-flop 26 which is to be applied to the controller 16. The controller 16 checks, at step 48, whether the uniform velocity interval is completed. If so, the controller 16 checks, at step 49, whether the output logic value of the latch 28 is logic "high". If the output logic value of the latch 28 is logic "high", the disk is judged a high density disk, and if not, the disk is judged a normal disk.

Figure 6:
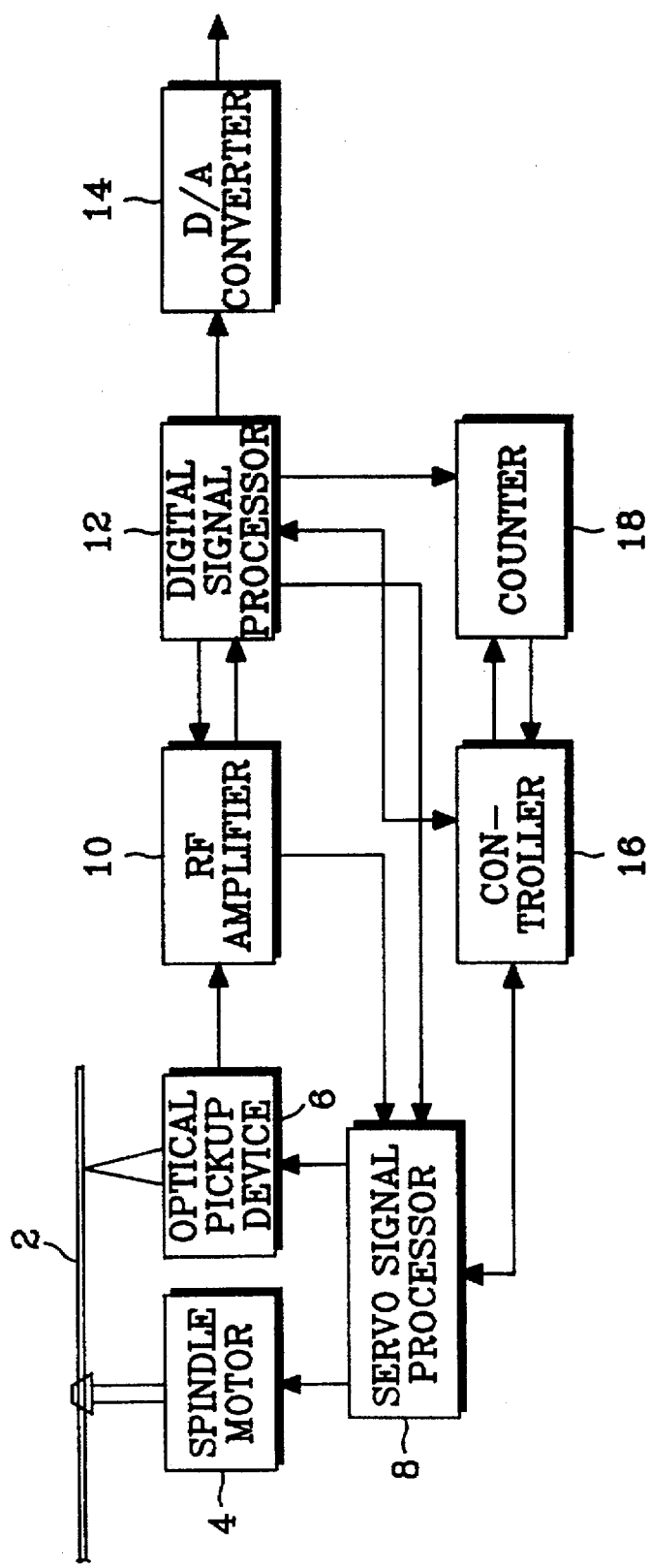
FIG. 6 is a block diagram of an optical disk reproducing apparatus according to another embodiment of the present invention.

FIG. 6 shows another example of an optical disk reproducing apparatus. A spindle motor 4 is driven by the control of a servo signal processor 8 to rotate a disk 2. An optical pickup device 6 picks up data recorded on the disk 2 by an optical system which is to be supplied to an RF amplifier 10. The servo signal processor 8 processes signals for a tracking servo, a focus servo, a sled servo, etc. of the optical pickup device 6 by the control of a controller 16 and the output signal of the RF amplifier 10, and drives the spindle motor 4 by the output signal of a digital signal processor 12. The RF amplifier 10 amplifies an RF signal picked up from the optical pickup device 6. The digital signal processor 12 shapes a track zero cross TZC signal, which is one of the RF signals amplified from the RF amplifier 10, to a logic waveform. The controller 16 controls the reproducing operation of the servo signal processor 8 and the digital signal processor 12 in order to reproduce the data recorded on the disk 2, and stores a setting reference value for discriminating the type of disk. When the disk 2 is mounted, the controller 16 generates a gate pulse and discriminates the type of disk by a disk discriminating control signal. A counter 18 is enabled by the gate pulse generated from the controller 16 and counts the track zero cross TZC waveform-shaped signal from the digital signal processor 12 during a uniform velocity interval.

Figure 7:
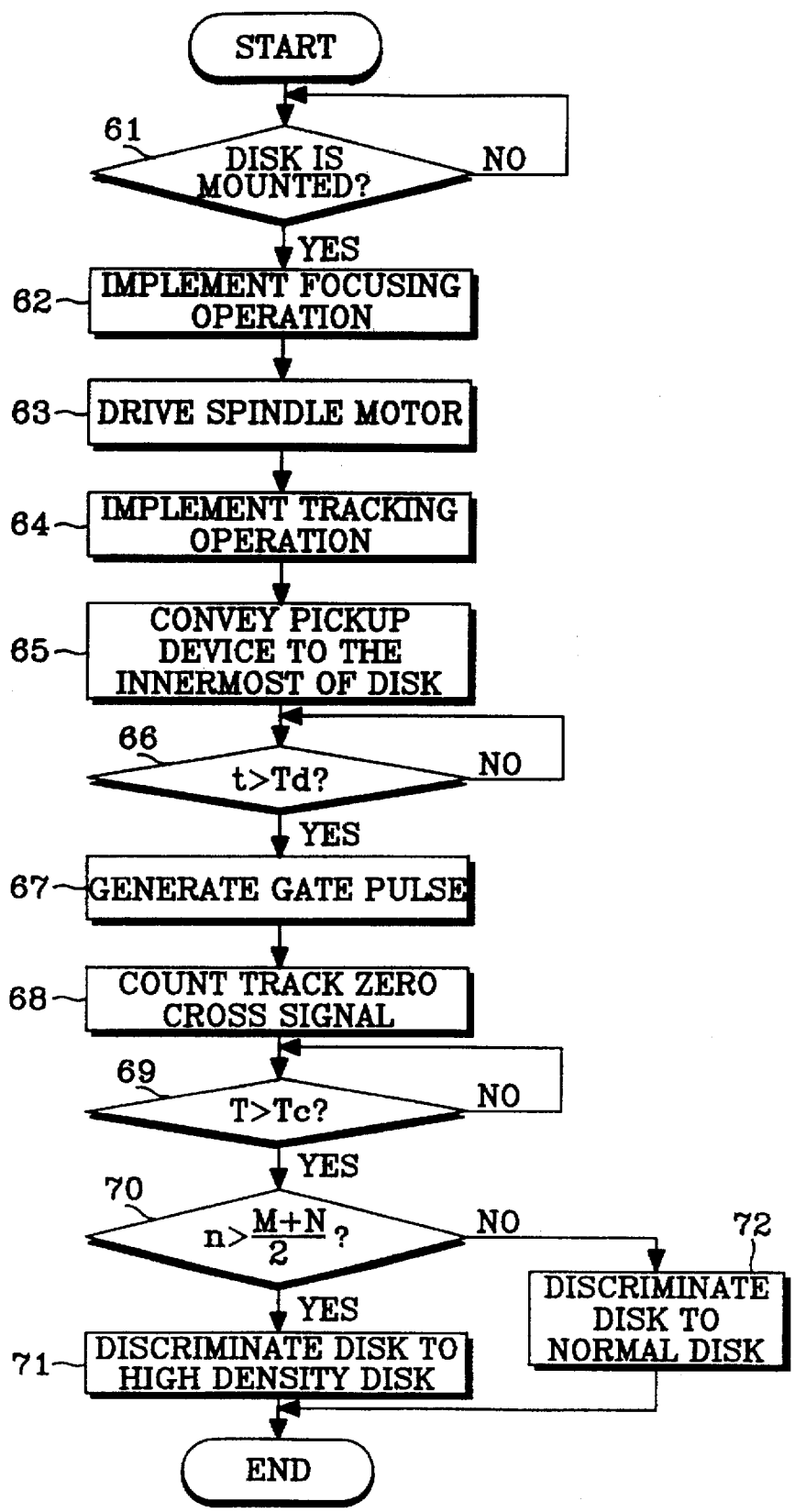
FIG. 7 is a flow chart showing a disk discriminating control procedure according to another embodiment of the present invention.

FIG. 7 shows another disk discriminating control flow. The controller 16 checks, at step 61, whether the disk 2 is mounted. If so, the controller 16 implements, at step 62, a focusing operation by controlling the servo signal processor 8. The controller 16 drives, at step 63, the spindle motor 4 by controlling the servo signal processor 8 to rotate the disk 2. The controller 16 implements, at step 64, a tracking operation by controlling the servo signal processor 8 in order to take the tracking servo. The controller 16 conveys, at step 65, the optical pickup device 6 to the innermost portion of the disk 2 in order to read a region of a TOC of the disk 2 by controlling the servo signal processor 8. The optical pickup device 6 generates a signal of a pulse train according to an optical quantity received from a photodiode while an optical beam spot crosses tracks and mirror portions of the disk 2. Since the two portions differ in the optical quantity received from the photodiode, the signal of the pulse train is supplied to the RF amplifier 10. The RF amplifier 10 amplifies the track zero cross signal TZC of this pulse form which is to be applied to the digital signal processor 12. The digital signal processor 12 waveform-shapes the track zero cross TZC signal to generate a signal shown in FIG. 5F or 5G.

The controller 16 checks, at step 66, whether a setting time Td from conveying the optical pickup device 6 has elapsed. That is, whether or not a sled motor reaches a uniform velocity interval is checked. If the setting time Td has elapsed, the controller 16 generates, at step 67, the gate pulse shown in FIG. 5B during the uniform velocity interval of a time Tc and supplies the gate pulse to the counter 18. The counter 18 counts the track zero cross TZC waveform-shaped signal from the digital signal processor 12. If the counted value of the track zero cross TZC signal of a normal disk is n and if the counted value of the track zero cross TZC signal of a high density disk is m during the uniform velocity interval, the controller 16 stores a logic value for an average value m+n/2 of two counted values. The controller 16 checks, at step 69, whether the uniform velocity interval is completed. If so, the controller 16 compares, at step 70, the counted value of the track zero cross signal with the reference value. If it exceeds the reference value, the disk is judged a high density disk, and if not, the disk is judged a normal disk.

As noted above, while the pickup device homes in on the inner portion of the disk in order to read the TOC, the track zero cross signal is counted to discriminate the type of disk being used. Therefore, the optical disk can be easily discriminated.

Therefore, it should be understood that the present invention is not limited to the particular embodiment disclosed herein. One skilled in the art may recognize modifications can be made without departing from the scope and spirit of the invention.

What is claimed is:

1. An apparatus for discriminating a type of an optical disk loaded into an optical disk reproducing apparatus, comprising:

a spindle motor for rotating said optical disk, said spindle motor being driven under servo control;

an optical pickup device for picking up data recorded on said optical disk including a track zero cross signal;

a servo signal processor for processing signals at least for a tracking servo, a focus servo, and a sled servo of said optical pickup device, and for driving said spindle motor;

a digital signal processor for shaping said track zero cross signal picked up from said optical pickup device to a logic waveform, and for outputting a signal to said servo signal processor for driving said spindle motor;

control means for controlling operation of said digital signal processor, for storing an optical disk discriminating reference value, for generating a gate pulse when said optical disk is mounted, and for comparing a counted value of said track zero cross signal with said optical disk discriminating reference value to discriminate the type of said optical disk; and counting means for counting said track zero cross signal waveform-shaped and output from said digital signal processor during a uniform velocity interval, said counting means being enabled by said gate pulse generated from said control means.

2. The apparatus according to claim 1, wherein said optical disk is discriminated as being one of a high density disk and a normal disk.

3. The apparatus according to claim 2, wherein said optical disk discriminating reference value is set by an average value of track counting values of said normal disk and said high density disk during said uniform velocity interval.

4. An apparatus for discriminating a type of an optical disk loaded into an optical disk reproducing apparatus, comprising:

a spindle motor for rotating said optical disk;

an optical pickup device for picking up data recorded on said optical disk;

a radio frequency (RF) amplifying means for amplifying an RF signal picked up from said optical pickup device;

a servo signal processor for processing signals at least for a tracking servo, a focus servo, and a sled servo of said optical pickup device in accordance with a control signal and an output signal of said RF amplifying means, and for driving said spindle motor;

a digital signal processor for shaping a track zero cross signal, which is one of said RF signals amplified from said RF amplifying means, to a logic waveform, and for outputting a signal to said servo signal processor to drive said spindle motor and for outputting said control signal to said servo signal processor;

control means for controlling operation of said digital signal processor, for storing a disk discriminating reference value, for generating a gate pulse when said optical disk is mounted, and for discriminating the type of said optical disk;

counting means for counting said track zero cross signal waveform-shaped and output from said digital signal processor during a uniform velocity interval, said counting means being enabled by said gate pulse generated from said control means; and disk discriminating control signal generating means for generating a disk discriminating control signal by comparing a counted value generated from said counting means with said disk discriminating reference value stored in said control means, wherein said control means discriminates the type of said optical disk in accordance with said disk discriminating control signal.

5. The apparatus according to claim 4, wherein said disk discriminating control signal generating means comprises:

rising edge detecting means for detecting a rising edge of said gate pulse output from said control means to generate a rising edge detecting signal;

falling edge detecting means for detecting a falling edge of said gate pulse output from said control means to generate a falling edge detecting signal;

a flip-flop for maintaining said disk discriminating control signal output from said counting means to a constant logic state until said falling edge detecting signal is generated, said flip-flop being loaded by said rising edge detecting signal; and latch means for latching said disk discriminating control signal output from said flip-flop by said falling edge detecting signal generated from said falling edge detecting means, and for supplying said disk discriminating control signal to said control means.

6. A method for discriminating a type of an optical disk loaded into an optical disk reproducing apparatus, said method comprising the steps of:

mounting said optical disk into said optical disk reproducing apparatus;

rotating said optical disk;

counting a track zero crossing signal during a uniform velocity interval in which an optical pickup device is moved toward an innermost portion of said optical disk after said optical disk is mounted; and discriminating the type of said optical disk by comparing a counted track zero crossing signal with a setting disk discriminating reference value.

7. The method according to claim 6, wherein said discriminating step comprises the step of discriminating said optical disk as one of a high density disk and a normal disk.

8. The method according to claim 7, further comprising the step of setting said disk discriminating reference value to correspond to an average value of track counting values of said normal disk and said high density disk during said uniform velocity interval.

* * * * *